(12) United States Patent
Jariwala

(10) Patent No.: US 9,234,105 B2
(45) Date of Patent: Jan. 12, 2016

(54) AQUEOUS FLUORINATED SILANE DISPERSIONS

(71) Applicant: 3M INNOVATIVE PROPERTIES COMPANY, St. Paul, MN (US)

(72) Inventor: Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/371,084

(22) PCT Filed: Jan. 9, 2013

(86) PCT No.: PCT/US2013/020759
§ 371 (c)(1),
(2) Date: Jul. 8, 2014

(87) PCT Pub. No.: WO2013/106383
PCT Pub. Date: Jul. 18, 2013

(65) Prior Publication Data
US 2015/0000557 A1   Jan. 1, 2015

Related U.S. Application Data

(60) Provisional application No. 61/584,903, filed on Jan. 10, 2012.

(51) Int. Cl.
*C09D 4/00* (2006.01)
*C09D 183/00* (2006.01)
*C09D 5/16* (2006.01)
*C09D 183/08* (2006.01)
*C08L 83/08* (2006.01)
*C09D 133/16* (2006.01)

(52) U.S. Cl.
CPC .............. *C09D 5/1625* (2013.01); *C08L 83/08* (2013.01); *C09D 4/00* (2013.01); *C09D 133/16* (2013.01); *C09D 183/08* (2013.01)

(58) Field of Classification Search
CPC ...... C09D 183/08; C09D 133/16; C09D 4/00; C09K 3/00; C09K 3/18; C08L 83/08
USPC .............................................. 106/2
See application file for complete search history.

(56) References Cited

U.S. PATENT DOCUMENTS

| | | |
|---|---|---|
| 3,772,195 A | 11/1973 | Francen |
| 4,090,967 A | 5/1978 | Falk |
| 4,099,574 A | 7/1978 | Cooper |
| 4,242,516 A | 12/1980 | Mueller |
| 4,359,096 A | 11/1982 | Berger |
| 4,383,929 A | 5/1983 | Bertocchio |
| 4,472,286 A | 9/1984 | Falk |
| 4,536,298 A | 8/1985 | Kamei |
| 4,795,764 A | 1/1989 | Alm |
| 4,935,464 A | 6/1990 | Ona |
| 4,983,769 A | 1/1991 | Bertocchio |
| 5,085,786 A | 2/1992 | Alm |
| 5,550,184 A * | 8/1996 | Halling ............... 524/837 |
| 5,952,409 A | 9/1999 | Boardman |
| 6,592,659 B1 | 7/2003 | Terrazas |
| 6,664,354 B2 | 12/2003 | Savu |
| 7,294,731 B1 | 11/2007 | Flynn |
| 7,572,848 B2 | 8/2009 | Savu |
| 7,652,115 B2 | 1/2010 | Dams |
| 7,998,585 B2 | 8/2011 | Dams |
| 2003/0113555 A1 | 6/2003 | Pellerite |

FOREIGN PATENT DOCUMENTS

| | | |
|---|---|---|
| JP | 2002-069824 | 3/2002 |
| WO | WO 01-90267 | 11/2001 |

OTHER PUBLICATIONS

Kissa, Fluorinated Surfactants and Repellents, 1-21 (2001).
International Search Report for PCT International Application No. PCT/US2013/020759, mailed on Jun. 6, 2013, 4pgs.

* cited by examiner

*Primary Examiner* — Anthony J Green

(57) ABSTRACT

The present disclosure relates to compositions and methods for making stable aqueous fluorinated silane dispersions.

17 Claims, No Drawings

AQUEOUS FLUORINATED SILANE DISPERSIONS

CROSS-REFERENCE TO RELATED APPLICATIONS

The present disclosure claims priority to U.S. Provisional Application Ser. No. 61/584,903, filed on Jan. 10, 2012, which is incorporated herein by reference in its entirety.

FIELD

The present disclosure relates to, among other things, compositions and methods for making stable aqueous fluorinated silane dispersions.

BACKGROUND

Oil-repellent and water-repellent coatings can be provided to certain substrates by applying to a substrate fluorinated silanes in the molten state or dissolved in volatile organic solvents. The applied fluorinated silanes can be cured by heating with a catalyst to chemically affix the fluorinated silanes to the substrates. However, the use of volatile organic solvents is generally harmful to the environment, and may be hazardous due to the flammability of the solvents. Therefore, an alternative means to apply fluorinated silanes to substrates was developed, which is to use aqueous delivery. One problem with known compositions for the aqueous delivery of fluorinated silanes to substrates is that they do not have long shelf lives (i.e., they are unstable).

It is desired to have stable fluorinated silane compositions that are delivered out of water for consumer application.

BRIEF SUMMARY

The present disclosure describes compositions and methods for making stable aqueous fluorinated silane dispersions, among other aspects.

In many embodiments, an aqueous dispersion is described. The aqueous dispersion includes a fluorinated silane being at least 90 wt % of total solids of the aqueous dispersion and a surfactant being from 0.1-10 wt % of total solids of the aqueous dispersion, and water. The fluorinated silane, surfactant and water form an aqueous dispersion.

In another embodiment, an aqueous dispersion is described. The aqueous dispersion includes a fluorinated silane and an additive being at least 90 wt % of total solids of the aqueous dispersion where the fluorinated silane is at least 5 wt % of total solids, a surfactant being from 0.1-10 wt % of total solids of the aqueous dispersion, and water. The fluorinated silane, additive, surfactant and water form an aqueous dispersion.

In yet another embodiment, a method of forming an aqueous dispersion is described. The method includes combining a fluorinated silane, and an optional additive and/or co-solvent, surfactant and water to form a mixture having a pH greater than 7, and emulsifying the mixture to form an aqueous dispersion.

The stable aqueous fluorinated silane dispersions or methods described herein may provide one or more advantages over prior fluorinated silane delivery systems. For example, prior aqueous fluorinated silane delivery systems suffered from poor stability. These and other advantages of the various embodiments of the devices and methods described herein will be readily apparent to those of skill in the art upon reading the disclosure presented herein.

As used herein, the term "dispersion" includes dispersions of a solid in a liquid as well as liquid in liquid dispersions, which are also called emulsions. Dispersions and emulsions contain both a dispersed and a continuous phase. Emulsions tend to have a cloudy appearance because the many phases interfaces scatter light as it passes through the emulsion. Emulsions generally appear white when all light scattered about equally. Microemulsions and nanoemulsions, however, tend to appear clear due to the small size of the dispersed phase. As used herein, "stable" means no separation or gelling after 2 weeks at 65° C.

DETAILED DESCRIPTION

In the following detailed description several specific embodiments of compositions and methods are illustrated. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The present disclosure describes, among other things, compositions and methods for making stable aqueous fluorinated silane dispersions. As described herein, the aqueous fluorinated silane dispersions and methods of making the same provide stable compositions that provide an extended shelf life and are deliverable out of water. The aqueous fluorinated silane dispersions and methods involve emulsification of fluorinated silanes with ionic surfactants and water at a pH above 7. While the present disclosure is not so limited, an appreciation of various aspects of the disclosure will be gained through a discussion of the examples provided below.

In many embodiments, the stable aqueous fluorinated silane dispersion includes fluorinated silane being at least 90 wt % of the total solids forming the stable aqueous fluorinated silane dispersion and a surfactant being from 0.1-10 wt % or from 1-5 wt % of the total solids forming the stable aqueous fluorinated silane dispersion and water. The stable aqueous fluorinated silane dispersion has a pH of 7 or greater, or from 7-11 or from 8-10. In many embodiments the ionic surfactant is an anionic surfactant. In many embodiments the stable aqueous fluorinated silane dispersion includes from 70-99 wt % water (based on total weight of the stable aqueous fluorinated silane dispersion). In some embodiments the stable aqueous fluorinated silane dispersion further includes a co-solvent.

In other embodiments the stable aqueous fluorinated silane dispersion includes fluorinated silane and additive being at least 90 wt % of the total solids forming the stable aqueous fluorinated silane dispersion wherein the fluorinated silane is at least 5 wt % of the total solids and a surfactant being from 0.1-10 wt % or from 1-5 wt % of the total solids forming the stable aqueous fluorinated silane dispersion and water. The stable aqueous fluorinated silane dispersion has a pH of 7 or greater, or from 7-11 or from 8-10. In many embodiments the ionic surfactant is an anionic surfactant. In many embodiments the stable aqueous fluorinated silane dispersion includes from 70-99 wt % water (based on total weight of the stable aqueous fluorinated silane dispersion).

An exemplary method of forming the stable aqueous fluorinated silane dispersion includes combining a fluorinated silane, surfactant, optionally an additive and/or co-solvent and water to form a mixture having a pH greater than 7 and emulsifying the mixture to form the stable aqueous dispersion.

Fluorinated silanes include fluorinated silane material, fluorinated polyether isocyanate derived silanes and fluorochemical oligomeric silanes. Exemplary fluorinated silanes are described in U.S. Pat. No. 6,592,659 (see Examples E1-E6 below) and U.S. Pat. No. 7,294,731 (see Example E8 below). Exemplary fluorinated polyether isocyanate derived silanes are described in U.S. Pat. No. 7,652,115 (see Example E7 below). Exemplary fluorochemical oligomeric silanes are described in U.S. Pat. No. 7,998,585 (see Example E11 below).

Exemplary fluorinated silanes include a fluorinated silane of the Formula I:

$$R_f^1\text{-}[\text{-}Q\text{-}[SiY_{3-x}R^1_x]_z]_y \quad (I)$$

wherein $R_f^1$ represents a monofunctional or difunctional fluorinated group; Q independently represents an organic difunctional or trifunctional linking group; $R^1$ independently represents a $C_1$-$C_4$ alkyl group; Y independently represents a hydrolyzable group; x is 0 or 1; y is 1 or 2; and z is 1 or 2.

Fluorinated silanes of Formula I are incompatible with water (meaning, the fluorinated silanes cannot substantially combine with water to form a single phase blend) and immiscible with water (meaning, the fluorinated silanes cannot substantially combine with water so as to result in the combination or blend exhibiting a single $T_g$ or $T_m$).

The monofunctional or difunctional fluorinated group $R_f^1$ includes linear, branched, and/or cyclic structures, that may be saturated or unsaturated. In many embodiments, it is a perfluorinated group (i.e., all C—H bonds are replaced by C—F bonds). However, hydrogen or chlorine may be present as substituents instead of fluorine provided that not more than one atom of either is present for every two carbon atoms, and, if hydrogen and/or chlorine is present, the $R_f^1$ group can terminate in at least one perfluoromethyl group.

Examples of fluorinated silanes of Formula I include, but are not limited to, the following: $C_7F_{15}CH_2OCH_2CH_2CH_2Si(OCH_3)_3$; $C_7F_{15}CH_2OCH_2CH_2CH_2Si(CH_3)(OCH_3)_2$; $C_7F_{15}CH_2OCH_2CH_2CH_2Si(OC_2H_5)_3$; $C_8F_{17}SO_2N(Et)CH_2CH_2CH_2Si(OCH_3)_3$; $C_4F_9SO_2N(Me)CH_2CH_2CH_2Si(OCH_3)_3$; $C_8F_{17}CH_2CH_2Si(OCH_3)_3$; $C_3F_7CH_2OCH_2CH_2CH_2Si(OCH_3)_3)_3$; $C_6F_{13}CH_2CH_2Si(OCH_2CH_3)_3$; and $C_8F_{17}CH_2CH_2Si(OCH_2CH_3)_3$. Mixtures of these fluorinated perfluoroalkyl silanes may be used if desired.

Exemplary fluorinated silanes further include a perfluoropolyether silane of the Formula II:

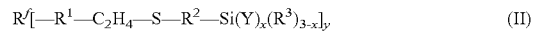

$$R_f[-R^1-C_2H_4-S-R^2-Si(Y)_x(R^3)_{3-x}]_y \quad (II)$$

wherein, in Formula II, $R^1$ is a covalent bond, —O—, or a divalent alkylene or arylene group, or combinations thereof, the alkylene groups optionally contain one or more catenary (in-chain) oxygen atoms. $R^2$ is a divalent alkylene or arylene groups, or combinations thereof, the alkylene groups optionally contain one or more catenary oxygen atoms. Y is a hydrolyzable group. $R^3$ is a monovalent alkyl or aryl group, x is 1, 2 or 3, and y is 1 or 2.

In Formula II, $R^f$ represents a mono- or divalent perfluoropolyether group. The perfluoropolyether group can include linear, branched, and/or cyclic structures, and may be saturated or unsaturated. It is a perfluorinated group, i.e., essentially all C—H bonds are replaced by C—F bonds.

Examples of perfluoropolyether silanes of Formula II include, but are not limited to, the following approximate average structures. The number of repeat units n and m will vary, with n from 1 to 50, generally 3 to 30, and n+m up to 30.

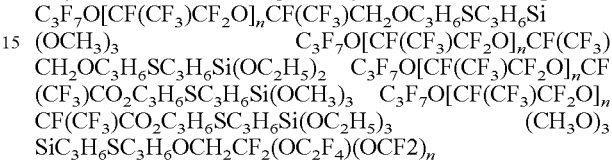

$C_3F_7O[CF(CF_3)CF_2O]_nCF(CF_3)CH_2OC_3H_6SC_3H_6Si(OCH_3)_3$; $C_3F_7O[CF(CF_3)CF_2O]_nCF(CF_3)CH_2OC_3H_6SC_3H_6Si(OC_2H_5)_2$; $C_3F_7O[CF(CF_3)CF_2O]_nCF(CF_3)CO_2C_3H_6SC_3H_6Si(OCH_3)_3$; $C_3F_7O[CF(CF_3)CF_2O]_nCF(CF_3)CO_2C_3H_6SC_3H_6Si(OC_2H_5)_3$;

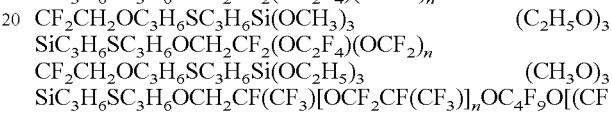

$(CH_3O)_3SiC_3H_6SC_3H_6OCH_2CF_2(OC_2F_4)(OCF_2)_nCF_2CH_2OC_3H_6SC_3H_6Si(OCH_3)_3$; $(C_2H_5O)_3SiC_3H_6SC_3H_6OCH_2CF_2(OC_2F_4)(OCF_2)_nCF_2CH_2OC_3H_6SC_3H_6Si(OC_2H_5)_3$;

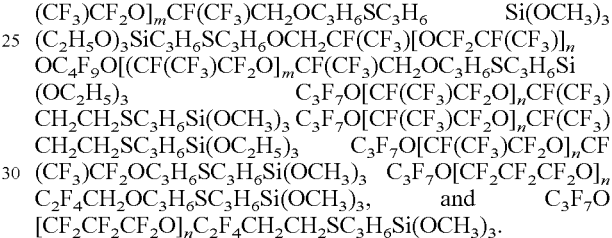

$(CH_3O)_3SiC_3H_6SC_3H_6OCH_2CF(CF_3)[OCF_2CF(CF_3)]_nOC_4F_9O[(CF(CF_3)CF_2O]_mCF(CF_3)CH_2OC_3H_6SC_3H_6Si(OCH_3)_3$; $(C_2H_5O)_3SiC_3H_6SC_3H_6OCH_2CF(CF_3)[OCF_2CF(CF_3)]_nOC_4F_9O[(CF(CF_3)CF_2O]_mCF(CF_3)CH_2OC_3H_6SC_3H_6Si(OC_2H_5)_3$; $C_3F_7O[CF(CF_3)CF_2O]_nCF(CF_3)CH_2CH_2SC_3H_6Si(OCH_3)_3$; $C_3F_7O[CF(CF_3)CF_2O]_nCF(CF_3)CH_2CH_2SC_3H_6Si(OC_2H_5)_3$; $C_3F_7O[CF(CF_3)CF_2O]_nCF(CF_3)CF_2OC_3H_6SC_3H_6Si(OCH_3)_3$; $C_3F_7O[CF_2CF_2CF_2O]_nC_2F_4CH_2OC_3H_6SC_3H_6Si(OCH_3)_3$, and $C_3F_7O[CF_2CF_2CF_2O]_nC_2F_4CH_2CH_2SC_3H_6Si(OCH_3)_3$.

Suitable surfactants for use in compositions of the present disclosure include ionic, zwitterionic, amphoteric, and non-ionic. Suitable surfactants can be fluorinated. Ionic surfactant families include, but are not limited to, sodium, ammonium and potassium salts of straight chain fatty acids (soaps), sodium and potassium salts of coconut oil fatty acids, sodium and potassium salts of tall oil acids, amine salts, acylated polypeptides, linear alkylbenzene sulfonates, higher alkyl benzene sulfonates, aromatic sulfonates, petroleum sulfonates, paraffin sulfonates (secondary n-alkanesulfonates), olefin sulfonates, sulfosuccinate esters, alkylnaphthylsulfonates, isothioates, sulfuric acid ester salts, including sulfated linear primary alcohols, sulfonated phenols, sulfated polyoxyethylenated alkyl phenols, sulfated polyoxyethylenated straight chain alcohols, sulfated triglyceride oils, phosphoric and polyphosphoric acid esters, fluoroaliphatic materials such as fluoroaliphatic anionics (e.g., carboxylates, sulfonates, sulfates and phosphates), long chain amines and their salts, diamines and polyamines and their salts, quaternary ammonium salts, polyoxyethylenated long-chain amines, quaternized polyoxyethylenated long chain amines, and amine oxides. Useful hydrotropes or anionic surfactants include sodium benzene sulfonate, sodium xylene sulfonate, sodium naphthalene sulfonate, and sodium cumene sulfonate. Also included are zwitterionic surfactants such as N-alkyl-β-iminodipropionic acids, imidazoline carboxylates, N-alkylbetaines, amine oxides, sulfobetaines and sultaines.

Fluorinated surfactants are amphiphilic materials, including one or more hydrophobic fluorochemical segments and one or more solubilizing and hydrophilic segments. Such materials are described in "Fluorinated Surfactants and Repellents", Second Edition, by E. Kissa, Surfactant Science Series, Volume 97, Marcel Dekker, Inc.: New York, 2001, pp 1-21. Fluorinated surfactants have a fluorine content by weight of at least 10%. These fluorinated surfactants can be monomeric or polymeric, with molecular weights between about 300 and about 100,000 grams per mole, or between about 400 and about 20,000 grams per mole. The hydrophobic fluorochemical groups can be, for instance, perfluoroalkyl containing between about 3 and about 20 carbon atoms, or a mono- or divalent perfluoropolyether group with molecular weight between about 300 and about 10,000 grams per mole. Hydrophilic groups on the fluorinated surfactants can be of anionic (such as carboxylate), cationic (such as quaternary ammonium), nonionic (such as oligo(oxyethylene)) or amphoteric (such as amine oxide) nature as long as they do not contain functionalities that cause instability in the concentrates of this invention, for example strongly acidic groups, strongly basic groups, or contamination by fluoride ions.

Representative fluorinated surfactants are described in U.S. Pat. No. 6,592,659 and include, but are not limited to, the following: $C_7F_{15}CO_2^-NH_4^+$; $C_8F_{17}SO_2N(C_2H_5)(C_2H_4O)_7CH_3$; $C_8F_{17}(C_2H_4O)_{10}H$; $(C_4F_9SO_2)_2N^- NH_4^+$; $C_4F_9SO_2N(CH_3)(C_2H_4O)_nCH_3$ (where $n_{avg}$ is about 7); $C_3F_7O(CF(CF_3)CF_2O)_nCF(CF_3)CO_2^-NH_4^+$ (where $n_{avg}$ is about 13). Examples of these and other useful fluorinated surfactants are described, for example, in U.S. Pat. No. 3,772,195 (Francen), U.S. Pat. No. 4,090,967 (Falk), U.S. Pat. No. 4,099,574 (Cooper et al.), U.S. Pat. No. 4,242,516 (Mueller), U.S. Pat. No. 4,359,096 (Berger), U.S. Pat. No. 4,383,929 (Bertocchio et al.), U.S. Pat. No. 4,472,286 (Falk), U.S. Pat. No. 4,536,298 (Kamei et al.), U.S. Pat. No. 4,795,764 (Alm et al.), U.S. Pat. No. 4,983,769 (Bertocchio et al.) and U.S. Pat. No. 5,085,786 (Alm et al.). Many of these fluorinated surfactants are commercially available from 3M Company (St. Paul, Minn.), having the tradename FLUORAD, or commercially available from E.I. DuPont de Nemours and Co. (Wilmington, Del.), having the tradename ZONYL.

Nonionic surfactants include, but are not limited to, polyoxyethylenated alkylphenols (such as the polyoxyethylenated derivatives of nonylphenol, octylphenol, and dodecylphenol), alcohol ethoxylates, polyoxyethylenated polypropylene glycol, polyoxyethylenated mercaptans, long chain carboxylic acid esters, glycerol, polyglycerol esters of natural fatty acids, polyoxyethylenated sorbitol esters, polyoxyethylenated fatty acid esters, alkanolamides, alkanolamine fatty acid condensates, tertiary acetylenic glycols, polyoxyethylenated silicones and alkylpolyglycosides.

Useful co-solvents include organic co-solvents, for example. In many embodiments, the organic co-solvent is an organic liquid component that is compatible with the surfactant(s) and the fluorinated silane(s), and can lower the viscosity of the stable aqueous fluorinated silane dispersion.

Suitable organic co-solvents are organic solvents, or mixtures of organic solvents, that include, but are not limited to, aliphatic alcohols, such as methanol, ethanol, and isopropyl alcohol; ketones, such as acetone or methyl ethyl ketone; esters, such as ethyl acetate or methyl formate; ethers, such as diisopropyl ether, 1,4-dioxane, and diethylene glycol dimethyl ether; and amides, such as N-methylpyrrolidinone, and N,N-dimethylformamide. Fluorinated organic solvents, such as heptafluorobutanol, trifluoroethanol and hexafluoroisopropanol, may be used alone or in combination with non-fluorinated organic co-solvents.

In many embodiments the organic co-solvent is an aliphatic alcohol. Some examples of aliphatic alcohols include ethanol, methanol and isopropyl alcohol. Other examples include those commercially available under the trade designations DOWANOL PnP (available from Sigma-Aldrich, Milwaukee, Wis.), and DOWANOL PM (available from Sigma-Aldrich), and DOWANOL DPM (available from Sigma-Aldrich). In many embodiments, the organic co-solvent is water miscible and can have a boiling point that is below 200° C.

As used herein, additives are any compounds (including small molecules and polymeric compounds) that can form a stable dispersion with a fluorinated silane. The additives can be provided by either (i) mixing an aqueous dispersion comprising a fluorinated silane with the emulsified additive or (ii) combining a fluorinated silane with additives and then emulsifying the mixture. Additives include, but are not limited to, silicone surfactants, hydrocarbon silanes (see examples E10 and E11), micro and/or nanoparticles of inorganic material, such as silica or titania or Li-silicates, stain blockers as defined in U.S. Pat. No. 5,952,409 (e.g., PM 700 in the examples). Additives can include fluorochemicals such as fluorochemical (meth)acrylate polymers or co-polymers or derivatives of fluorochemical (meth)acrylates (exemplary derivatives of (meth)acrylates include PM4800 fluorochemical acrylate based polymer), fluorochemical esters and polyesters, fluorine containing urethanes, fluorine containing phosphates, fluorine containing poly carbodiimides.

Exemplary Embodiments

1. An aqueous dispersion comprising:
   a fluorinated silane being at least 90 wt % of total solids of the aqueous dispersion;
   a surfactant being from 0.1-10 wt % of total solids of the aqueous dispersion; and
   water;
   wherein the fluorinated silane, surfactant and water form an aqueous dispersion.
2. The aqueous dispersion of embodiment 1, wherein the surfactant is from 1-5 wt % of total solids of the aqueous dispersion.
3. The aqueous dispersion of embodiment 1 or 2, wherein the aqueous dispersion has a pH in a range from 7-11.
4. The aqueous dispersion of any of embodiments 1 to 3, wherein the surfactant comprises an anionic surfactant.
5. The aqueous dispersion of any of embodiments 1 to 4, wherein the surfactant comprises an anionic surfactant and a nonionic surfactant.
6. The aqueous dispersion of any of embodiments 1 to 5, wherein the aqueous dispersion comprises from 70-99 wt % water.
7. The aqueous dispersion of any of embodiments 1 to 6, wherein the aqueous dispersion comprises a co-solvent.
8. The aqueous dispersion of any of embodiments 1 to 4, 6 and 7, wherein the fluorinated silane comprises HFPO silane and the surfactant comprises an anionic surfactant.
9. An aqueous dispersion comprising:
   a fluorinated silane and additive being at least 90 wt % of total solids of the aqueous dispersion wherein the fluorinated silane is at least 5 wt % of the total solids;
   a surfactant being from 0.1-10 wt % of total solids of the aqueous dispersion; and
   water;
   wherein the fluorinated silane, additive, surfactant and water form an aqueous dispersion.
10. The aqueous dispersion of embodiment 9, wherein the surfactant is from 1-5 wt % of total solids of the aqueous dispersion.
11. The aqueous dispersion of embodiment 9 or 10, wherein the aqueous dispersion has a pH in a range from 7-11.
12. The aqueous dispersion of any of embodiments 9 to 11, wherein the surfactant comprises an anionic surfactant.

13. The aqueous dispersion of any of embodiments 9 to 12, wherein the aqueous dispersion comprises from 70-99 wt % water.

14. The aqueous dispersion of any of embodiments 9 to 13, wherein the additive is a hydrocarbon silane.

15. The aqueous dispersion of any of embodiments 9 to 13, wherein the additive is a fluorochemical (meth)acrylate or derivative of a fluorochemical (meth)acrylate.

16. The aqueous dispersion of any of embodiments 9 to 13, wherein the fluorinated silane comprises HFPO silane and the surfactant comprises an anionic surfactant and the additive comprises a hydrocarbon silane, a fluorochemical (meth) acrylate or derivative thereof, or a non-functional silane.

17. A method comprising;
combining a fluorinated silane, surfactant and water to form a mixture having a pH greater than 7; and
emulsifying the mixture to form an aqueous dispersion.

18. The method of embodiment 17, wherein the fluorinated silane is at least 90 wt % of total solids of the aqueous dispersion and the surfactant is from 0.1-10 wt % of total solids of the aqueous dispersion.

19. The method of embodiment 17 or 18, wherein the surfactant comprises an anionic surfactant.

20. The method of any one of embodiments 17 to 19, wherein the aqueous dispersion comprises from 70-99 wt % water.

EXAMPLES

Objects and advantages of this invention are further illustrated by the following examples, but the particular materials and amounts thereof recited in these examples, as well as other conditions and details, should not be construed to unduly limit this invention.

Materials

Materials utilized in the sample compositions are shown in Tables 1-3.

TABLE 1

Materials List

| Compound | Source | Description |
|---|---|---|
| MeFBSEA | 3M Company, St. Paul, MN | $C_4F_9SO_2—N(CH_3)C_2H_4OCOCH=CH_2$ |
| 2-Mercaptoethanol | Sigma-Aldrich, St. Louis, MO | $HSCH_2CH_2OH$ |
| VAZO-67 | Sigma-Aldrich, St. Louis, MO | 2,2'-Azobis(2-methylbutyronitrile) |
| 3-(Triethoxysilyl)propyl isocyanate | Sigma-Aldrich, St. Louis, MO | $(C_2H_5O)_3Si(CH_2)_3NCO$ |
| DBTDL (dibutyltin dilaurate) | Sigma-Aldrich, St. Louis, MO | $(CH_3CH_2CH_2CH_2)_2Sn[OCO(CH_2)_{10}CH_3]_2$ |
| EA600 | Clariant, Frankfurt, Germany | FLUOWET EA600 $CF_3(CF_2)_5CH_2CH_2OH$ |
| DPM (dipropylene glycol monomethyl ether) | TCI Co. Ltd, Tokyo, Japan | $CH_3(OC_3H_6)_2OH$ |
| PM4800 | 3M Company, St. Paul, MN | Fluorochemical acrylate based polymer |
| DDBSA (dodecylbenzene sulfonic acid) | Spectrum Chemical Corp., Gardena, CA | $CH_3(CH_2)_{11}C_6H_4SO_3H$ |

TABLE 2

Silanes

| Compound | Source | Description |
|---|---|---|
| HFPO silane (fluorochemical silane) | 3M Company, St. Paul, MN | $C_3F_7O(CF(CF_3)CF_2O)_mCF(CF_3)C(O)NH-CH_2CH_2CH_2-Si(OMe)_3$<br>See U.S. Pat. No. 6,592,659 Table 1 |
| Z-2306 (hydrocarbon silane) | Dow Corning, Midland, MI | $(CH_3)_2CHCH_2Si(OCH_3)_3$ |
| TEOS (tetraethylortho-silicate) (hydrocarbon silane) | Sigma-Aldrich, St. Louis, MO | $Si(OC_2H_5)_4$ |
| LTM disilane (fluorochemical silane) | 3M Company, St. Paul, MN | See U.S. Pat. No. 7,294,731 Example 3 |
| C4-Silane (fluorochemical silane) | 3M Company, St. Paul, MN | $(C_4F_9SO_2N(CH_3)C_3H_6—Si(OCH_3)_3)$ see U.S. Pat. No. 7,998,585, preparation 5 |

$(MeFBSEA)_4\text{-}SC_2H_4OCONH\text{—}C_3H_6\text{—}Si(OEt)_3$

A flask was charged with 100 grams (g) (0.243 moles) MeFBSEA, 4.74 g (0.061 moles) 2-mercaptoethanol, and 110 g ethylacetate. Nitrogen was bubbled through this mixture for 10 minutes prior to the addition of 0.4 g of VAZO-67. The flask was heated at 70° C. for 15 hours under nitrogen to convert the MeFBSEA monomer to the oligomer. Ethyl acetate (25 g) was then added to the flask and 25 g of ethyl acetate were distilled out. The temperature was reduced to 65° C. and 15.05 g (0.061 moles) 3-(triethoxysilyl)propyl isocyanate and 2 drops DBDTL were added. After 6-7 hours, infrared analysis indicated complete conversion of the isocyanate.

C6-Silane $(C_6F_{13}C_2H_4OCONHC_3H_6\text{—}Si(OCH_3)_3)$

A flask was charged with 36 g EA-600 (0.098 moles) and 12 g ethyl acetate. To this mixture, 20.09 g 3-(triethoxysilyl)propyl isocyanate (0.098 moles) was added dropwise at room temperature under $N_2$, followed by 10 mcL DBTDL. The solution was degassed for 10 minutes using $N_2$ and stirred at 70° C. for 12 hours. The reaction mixture was cooled and filtered using Watman 40 filter paper, and excess ethyl acetate was evaporated using a rotary evaporator. Infrared analysis indicated complete conversion of the isocyanate.

HFPO Disilane

The HFPO disilane was prepared per Example 3 in U.S. Pat. No. 7,652,115 with HFPO—$COOCH_3$ (3M Company, St. Paul, Minn.) replacing the HFPO-oligomeric diester.

Surfactants

TABLE 3

Surfactants

| Compound | Source | Description |
|---|---|---|
| Arq 12-50 | Akzo Nobel Corp., Chicago, IL | ARQUAD 12-50 $CH_3(CH_2)_{11}N(CH_3)_3Cl$ |
| AMV | Stepanol Corp., Northfield, IL | $CH_3(CH_2)_{11}OSO_3NH_4$ |
| $C_4F_9\text{—}SO_2NC_6H_{13}CH_2CH(OH)CH_2\text{—}SO_3^-NH_4^+$ | 3M Company, St. Paul, MN | See U.S. Pat. No. 7,572,848 |
| TERGITOL 15-S-30 | Dow Chemical Company, Midland, MI | Non-ionic secondary alcohol ethoxylate |
| MeFBSEA/CW750A/AMPS | 3M Company, St. Paul, MN | See U.S. Pat. No. 6,664,354, Example 3 |

$NH_4$ DDBS

DDBSA was titrated to pH 8-10 with ammonium hydroxide.

Test Methods

Stability—Stability was assessed after storing the sample mixtures at 65° C. for two weeks. A stable mixture did not separate or gel, while an unstable sample mixture separated or gelled upon storage.

Appearance—Appearance was a visual assessment of the sample dispersions. Appearance ranged from clear, mostly clear, slightly hazy, milky and turbid.

Oil Repellency—Oil Repellency was determined with 3M Oil Repellency Test III for Floor Coverings (February 1994, available from 3M Company). Ratings from 1 to 8 were assigned, with higher values indicating better oil repellency.

Water Repellency—Water Repellency was determined with 3M Water Repellency Test V for Floor Coverings (February 1994, available from 3M Company). Ratings from 1 to 10 were assigned, with higher values indicating better water repellency.

Stain Release—Stain release was determined with 3M Stain Release Test II for Floor Coverings (January 2007, available from 3M Company). Briefly, a colorimeter (Minolta model CR-310, Konica Minolta, Osaka, Japan) was utilized to measure the color of a carpet sample before and after a stain challenge. A carpet sample was stained with FD&C Red 40, and then rinsed with lukewarm water. The difference between these two readings was reported.

Soil Repellency—A colorimeter was utilized to measure the color of a carpet sample before and after a stain challenge. This challenge consisted of placing the samples on a hallway floor and allowing foot traffic, then vacuuming to remove loose materials. The difference between these two readings was reported.

Example E-1

To 50 g HFPO-silane was added 50 g ethyl acetate. In a separate beaker, 200 g water, 10 g DPM, and 2.5 g AMV were mixed, and the pH adjusted to 9-10 with ammonium hydroxide. The ethyl acetate solution was slowly added to the water phase while stirring and this mixture was passed through a HC-8000 microfluidizer (Microfluidics, Newton, Mass.) at 4000-5000 psi twice or sonicated for 3 minutes using a Branson SONIFIER 450 (Branson Ultrasonics, Danbury, Conn.). The ethyl acetate was evaporated under reduced pressure at 40° C. using BUCHI ROTOVAPOR R-124 (BUCHI Corporation, New Castle, Del.).

Examples E-2 through E-9

The same procedure as described in E-1 was utilized with the materials listed in Table 4.

Example E-10 through E13

The same procedure as described in E-1 was utilized with the materials listed in Table 5. A percentage of silane additive was substituted for the fluorochemical silane. DPM was not used in Examples E-10 and E-11.

Comparative C-1, Emulsification Using TERGITOL 15-S-30

To 25 g of HFPO silane was added 25 g of ethyl acetate. In a separate beaker 200 g of water was added to 0.75 g of TERGITOL 15-S-30, and the pH adjusted to 9-10 with ammonium hydroxide. The water mixture was slowly added to the silane mix and sonicated for three minutes with stirring at room temperature. The ethyl acetate was evaporated under reduce pressure. The resulting dispersion gelled upon standing.

Comparative C-2, Emulsification of Hydrocarbon Silane Using Anionic Surfactant A similar procedure as described in E-1 was used with the exception that NH$_4$DDBS was replaced by AMV and HFPO silane was replaced by Z-2306. The resulting dispersion was clear. However, after 2 days at room temperature, the dispersion had separated into layers.

Comparative C-3, Preparation of Water Dilutable Concentrate as in Example 15 of U.S. Pat. No. 7,652,115

To 3 g of HFPO silane was added 1 g of MeFSEA/CW750A/AMPS and 12 g isopropanol. The pH was adjusted to 9-10 with ammonium hydroxide, diluted to 100 g with water, and mixed well. The resulting mixture had two layers indicating the HFPO-silane did not emulsify.

Comparative C-4, This Comparative was Prepared According to U.S. Pat. No. 6,592,659

To a vial was added 2 g HFPO-silane and 1 g MeFBSEA/CW750A/AMPS. To this was added 5 g DPM, and the pH was adjusted to 8-10 with ammonium hydroxide. This mixture was diluted with 12 g water and mixed well. The resulting 20 wt % concentrate solution had 2 phases indicating that the fluorochemical silane did not emulsify. This mixture was further diluted with 100 g water and mixed well to make a 3% solids dispersion. The resulting solution had 2 phases making it unsuitable for aqueous delivery.

Results

Example (E) and Comparative (C) formulations and test results are shown in Tables 4 and 5. In each case, the Example dispersions, emulsions and/or microemulsions were stable at 65° C. for two weeks, while the Comparatives were unstable or didn't emulsify.

TABLE 4

Sample Formulations Without Additives

| | Fluorochemical Silane | Surfactant | Surfactant Type | % Solids | Appearance |
|---|---|---|---|---|---|
| E-1 | HFPO silane | NH$_4$ DDBS | Anionic | 19.8 | Clear |
| E-2 | HFPO silane | Arq 12-50 | Cationic | 16.3 | Mostly Clear |
| E-3 | HFPO silane | AMV | Anionic | 16.0 | Clear |
| E-4 | C$_4$F$_9$ silane | NH$_4$ DDBS | Anionic | 18.0 | Milky |
| E-5 | C$_6$F$_{13}$ silane | AMV | Anionic | 20.0 | Slightly hazy |
| E-6 | HFPO di-silane | AMV | Anionic | 22.4 | Turbid |
| E-7 | LTM di-silane | AMV | Anionic | 21.5 | Clear |
| E-8 | HFPO silane | C$_4$F$_9$—SO$_2$N(CH$_3$)CH$_2$CH(OH)CH$_2$SO$_3^-$NH$_4^+$ | Anionic | 20.6 | Clear |
| E-9 | (MEFBSEA)$_4$-SC$_2$H$_4$OCONH—C$_3$H$_6$—Si(OEt)$_3$ | AMV | Anionic | 21.9 | Milky |
| C-1 | HFPO silane | TERGITOL 15-S-30 | Nonionic | [a] | Milky |
| C-2 | Z-2306 | AMV | Anionic | [b] | Clear |
| C-3 | HFPO silane | MeFSEA/CW750A/AMPS | Anionic | [c] | [c] |
| C-4 | HFPO silane | MeFBSEA/CW750A/AMPS | Anionic | [c] | [c] |

[a] dispersion gelled
[b] dispersion separated after 2 days of storage
[c] mixture did not emulsify

TABLE 5

Example Formulations Containing Additives

| | Fluorochemical Silane | Additive | Surfactant | Surfactant Type | % Solids | Appearance |
|---|---|---|---|---|---|---|
| E-10 | HFPO silane (50%) | Z-2306 (50%) | NH$_4$ DDBS | Anionic | 13.1 | Mostly Clear |
| E-11 | HFPO silane (90%) | TEOS (10%) | AMV | Anionic | 20.5 | Clear |
| E-12 | HFPO silane (80%) | PM4800 (20%) | NH$_4$ DDBS | Anionic | 17.5 | Mostly Clear |
| E-13 | HFPO silane (50%) | PM4800 (50%) | NH$_4$ DDBS | Anionic | 17.5 | Milky |

Tables 4 and 5 demonstrate the stability of dispersions/emulsions/microemulsions containing fluorochemical silanes and ionic surfactants. Stable dispersions/emulsions/microemulsions were also formed by blending fluorochemical silanes with hydrocarbon silane additives in the presence of ionic surfactants.

The Example dispersions/emulsions/microemulsions were diluted with water to 3 wt % solids, mixed with 5% DPM, and applied on cured, cleaned concrete or grout with a pipette. Appearance of the diluted coating dispersions was noted. The coatings were allowed to dry for 24 hrs then tested for repellency. Results are shown in Table 6.

TABLE 6

Repellency on Concrete

| Sample | Appearance | Oil Repellency | Water Repellency |
|---|---|---|---|
| E-1 | Clear | 5 | 8 |
| E-2 | Mostly Clear | 7 | 6 |
| E-3 | Clear | 5 | 7 |
| E-4 | Milky | 2 | 5 |
| E-5 | Clear | 7 | 8 |
| E-6 | Clear | 5 | 3 |
| E-7 | Clear | 5 | 3 |
| E-8 | Clear | 2 | 2 |
| E-9 | Milky | 7 | 9 |
| E-10 | Mostly Clear | 6 | 8 |
| E-11 | Clear | 3 | 2 |
| E-12 | Clear | 8 | 9 |
| E-13 | Milky | 8 | 10 |

Several example dispersions/emulsions/microemulsions were coexhaust applied with a stainblocker (PM700 from 3M Company) at approximately pH 2 on NYLON 66 carpet, then tested for water and oil repellency, stain release, and soil repellency. Results are shown in Table 7.

TABLE 7

Repellency on Carpet

| Sample | % POC [a] | Repellency Oil | Repellency Water | Stain Release | Soil Repellency |
|---|---|---|---|---|---|
| E-2 | 0.80 | 4 | 3 | 0.4 | 6.1 |
| E-4 | 0.33 | 3 | 2 | 0.7 | 6.4 |
| E-5 | 0.52 | 0 | 2 | 0.3 | 4.7 |
| Untreated | 0 | 0 | 0 | −0.5 | 40.2 | 7.3 |

[a] Percent product on carpet

Thus, embodiments of AQUEOUS FLUORINATED SILANE DISPERSIONS are disclosed. The disclosed embodiments are presented for purposes of illustration and not limitation.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An aqueous dispersion comprising:
   a fluorinated silane being at least 90 wt % of total solids of the aqueous dispersion;
   an anionic surfactant being from 0.1 wt % to about 5 wt % of total solids of the aqueous dispersion; and
   water;
   wherein the fluorinated silane, surfactant and water form an aqueous dispersion; and
   wherein the aqueous dispersion has a pH in a range of about 7 to about 11, and is stable, wherein there is no separation or gelling after 2 weeks at 65° C.

2. The aqueous dispersion of claim 1, wherein the anionic surfactant is from about 1 wt % to about 5 wt % of total solids of the aqueous dispersion.

3. The aqueous dispersion of claim 1, wherein the aqueous dispersion further comprises a nonionic surfactant.

4. The aqueous dispersion of claim 1, wherein the aqueous dispersion comprises from about 70 wt % to about 99 wt % water.

5. The aqueous dispersion of claim 1, wherein the aqueous dispersion comprises a co-solvent.

6. The aqueous dispersion of claim 1, wherein the fluorinated silane comprises HFPO silane.

7. The aqueous dispersion of claim 1, wherein the anionic surfactant is not fluorinated.

8. An aqueous dispersion comprising:
   a fluorinated silane and additive being at least 90 wt % of total solids of the aqueous dispersion wherein the fluorinated silane is at least 5 wt % of the total solids;
   an anionic surfactant being from 0.1 wt % to about 5 wt % of total solids of the aqueous dispersion; and
   water;
   wherein the fluorinated silane, additive, surfactant and water form an aqueous dispersion; and
   wherein the aqueous dispersion has a pH range of about 7 to about 11, and is stable, wherein there is no separation or gelling after 2 weeks at 65° C.

9. The aqueous dispersion of claim 8, wherein the surfactant is from about 1 wt % to about 5 wt % of total solids of the aqueous dispersion.

10. The aqueous dispersion of claim 8, wherein the aqueous dispersion further comprises a nonionic surfactant.

11. The aqueous dispersion of claim 8, wherein the aqueous dispersion comprises from about 70 wt % to about 99 wt % water.

12. The aqueous dispersion of claim 8, wherein the additive is a hydrocarbon silane.

13. The aqueous dispersion of claim 8, wherein the additive is a fluorochemical (meth)acrylate or derivative of a fluorochemical (meth)acrylate.

14. The aqueous dispersion of claim 8, wherein the fluorinated silane comprises HFPO silane and the surfactant comprises an anionic surfactant and the additive comprises a hydrocarbon silane, a fluorochemical (meth)acrylate or derivative thereof, or a non-functional silane.

15. The aqueous dispersion of claim 8, wherein the surfactant is not fluorinated.

16. A method comprising;
   combining a fluorinated silane, an anionic surfactant and water to form a mixture having a pH greater than 7; and
   emulsifying the mixture to form an aqueous dispersion;
   wherein the fluorinated silane is at least 90 wt % of total solids of the aqueous dispersion; and
   wherein the aqueous dispersion has a pH range of about 7 to about 11, and is stable, wherein there is no separation or gelling after 2 weeks at 65° C.

17. The method of claim 16, wherein the anionic surfactant is from about 0.1 wt % to about 5 wt % of total solids of the aqueous dispersion, wherein the aqueous dispersion comprises from 70 wt % to about 99 wt % water.

* * * * *